US005122216A

United States Patent [19]

Goodwin, III

[11] Patent Number: 5,122,216

[45] Date of Patent: Jun. 16, 1992

[54] MULTI-PLY MAILER FORM AND METHOD OF MANUFACTURE THEREFOR

[75] Inventor: Thomas A. Goodwin, III, Dallas, Tex.

[73] Assignee: Goodwin Graphics, Inc., Dallas, Tex.

[21] Appl. No.: 503,732

[22] Filed: Apr. 3, 1990

Related U.S. Application Data

[62] Division of Ser. No. 310,924, Feb. 15, 1989, abandoned.

[51] Int. Cl.[5] .............................................. B32B 31/12

[52] U.S. Cl. .................................... 156/303; 156/552; 156/568; 156/571; 156/DIG. 38

[58] Field of Search ............... 156/302, 303, 552, 568, 156/571, DIG. 38; 493/333

[56] References Cited

U.S. PATENT DOCUMENTS

| | | | |
|---|---|---|---|
| 3,560,309 | 2/1971 | Gruver et al. | 156/568 |
| 3,586,585 | 6/1974 | Kirk et al. | 156/568 |
| 3,868,292 | 2/1975 | Ernst et al. | 156/568 |
| 3,869,328 | 3/1975 | Instance | 156/552 |
| 4,425,386 | 1/1984 | Chang | 427/150 |
| 4,838,982 | 6/1989 | Klaeser et al. | 156/552 |

*Primary Examiner*—Michael W. Ball
*Assistant Examiner*—Francis J. Lorion
*Attorney, Agent, or Firm*—David H. Judson

[57] ABSTRACT

In a preferred method for affixing a discrete paper label to the mailer, a discrete paper label is suctioned onto the rotatable platen at a first predetermined position relative to the circumferential perimeter of the platen. As the rotatable platen rotates, adhesive is applied to a predetermined exposed portion of the paper label at a second predetermined position relative to the circumferential perimeter. Finally, at a third predetermined position relative to the circumferential perimeter, the paper label is blown off the rotatable platen and onto an adjacent continuously advancing web comprising multi-ply mailer forms each having a plurality of sheets in superimposed relationship. The paper label is thus affixed to a multi-ply mailed form at a predetermined location. Preferably, the rotatable platen receives a new paper label at the first predetermined position as the adhesive is applied to the label previously received on the platen.

3 Claims, 2 Drawing Sheets

MULTI-PLY MAILER FORM AND METHOD OF MANUFACTURE THEREFOR

This application is a division, of application Ser. No. 07/310,924, filed Feb. 15, 1989 now abandoned.

TECHNICAL FIELD

The present invention relates generally to business forms and methods of manufacture therefor and more particularly to a multi-ply mailer having at least one carbonless "self-contained" label selectively affixed thereto.

BACKGROUND OF THE INVENTION

It is known in the prior art to provide a multi-ply business form having one or more localized autogenous coatings each comprising both microscopic pressure-rupturable capsules containing a chromogenic material, and an electron acceptor material. One such form is disclosed in U.S. Pat. No. 4,425,386 to Chang. Each localized autogenous coating is capable of reacting under the impact of a printing stylus to release the chromagen from the capsules for reaction with the electron acceptor material to provide a visible image comprising address or other information. The use of such coatings advantageously enables the user of the form to selectively print one type of information on a coating located, for example, on an outside ply and a second type of information on a coating located on an inside ply.

It is also known in the prior art to selectively print information On a multi-ply business form using a chemically-reactive ribbon in which the ribbon for the printer is coated with a color-forming chromogenic material in solution. The mailer, rather than including a complete autogenous coating as in the Chang patent, simply includes a spot coating of color developer material located on the front of the mailer. This form is described in U.S. Pat. No. 4,172,605 to Welsch et al.

While the above-described mailers have certain advantages over conventional mailers that typically employ spot coatings of carbon ink on the backside of a detachable top record sheet, accurate placement of autogenous coatings on a mailer requires a complex and therefore expensive and unreliable manufacturing process. Moreover, it is often difficult to apply the localized autogenous coating in a uniform manner or without actually activating the capsules during application. The resulting coating is thus "bruised" or discolored and at least partly incapable of reacting with the printing stylus; the address or other information, therefore, may be inaccurate. The use of a chemically-reactive ribbon coated with chromogenic material in solution is likewise disadvantageous because the ribbon is expensive and has a short useful life.

It would therefore be advantageous to provide a multi-ply business form and method of manufacture therefor which overcomes these and other problems associated with the prior art.

BRIEF SUMMARY OF THE INVENTION

It is an object of the present invention to provide a business form which includes at least one carbonless paper label selectively affixed to a sheet of the business form and capable of reacting with a ribbonless printing stylus to provide a visible image on the label.

It is yet another object of the present invention to provide a multi-ply business form comprising a plurality of sheets in superimposed relationship, the sheets including a top sheet on which a self-contained label is affixed at a predetermined location Preferably using a food adhesive, water-soluble or hot-melt, resin-based glue.

It is a still further object of the invention to describe a method of manufacturing a multi-ply business form wherein one or more self-contained labels are selectively affixed to the form without bruising or otherwise activating the chromogenic material therein.

These and other objects of the invention are provided by a multi-ply business form comprising a plurality of sheets in superimposed relationship, the Plurality of sheets including a top sheet having a predetermined surface area. In the preferred embodiment, at least one discrete paper label substantially smaller than the predetermined surface area of the top sheet is secured to an outer surface of the top sheet at a predetermined location. The discrete paper label, which preferably has a front side, a rear side and a peripheral edge, advantageously comprises an admixture of electron-acceptor material and chromagen-containing microscopic pressure-rupturable capsules. The label is secured to the top sheet using an adhesive means located on the rear side of the paper label adjacent predetermined portions of the peripheral edge. The adhesive maintains the label is the selected location under the impact of a ribbonless printing stylus.

In the preferred embodiment, the adhesive means extends adjacent the entire peripheral edge of the rear side of the label. Alternatively, the adhesive extends along the top and bottom edges of the label, or the adhesive extends along only the side edges. The majority of the rear side of the label, however, is substantially free of adhesive to avoid activation of the pressure-rupturable capsules during affixation of the paper label to the top sheet. The adhesive means is preferably a food adhesive, hot-melt, resin-based glue.

In accordance with yet a further feature of the invention, a method is described for affixing paper labels to multi-ply mailers using a rotatable platen having an axis of rotation. According to the preferred embodiment, the method begins with the step of: (a) suctioning a discrete paper label onto the rotatable platen at a first predetermined position relative to the axis of rotation, the paper label comprising an admixture of electron-acceptor material and chromagen-containing microscopic pressure-rupturable capsules. As the rotatable platen rotates, the method continues by applying adhesive to one or more predetermined exposed portions of the paper label at a second predetermined position relative to the axis of rotation. Finally, at a third predetermined position relative to the axis of rotation, the paper label is blown off the rotatable platen and onto an adjacent continuously advancing web comprising multi-ply mailer forms each having a plurality of sheets in superimposed relationship. The paper label is thus affixed to a multi-ply mailer form at a predetermined location. The method also includes the step of heating the continuously advancing web immediately following transfer of the paper label to the mailer to thereby dry the adhesive prior to any chemical reaction between the adhesive and the chemicals in the label. Preferably, the rotatable platen receives a new paper label at the first predetermined position as the adhesive is applied to the label previously received on the platen.

The foregoing has outlined some of the more pertinent objects of the present invention. These objects should be construed to be merely illustrative of some of the more prominent features and applications of the invention. Many other beneficial results can be attained by applying the disclosed invention in a different manner of modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which.

Similar reference characters refer to similar parts throughout the several views of the drawings.

DETAILED DESCRIPTION

"Self-contained" carbonless paper is known in the prior art and advantageously comprises an admixture of electron-acceptor material and chromagen-containing microscopic pressure-rupturable capsules. In use, the impact of a printing stylus on the paper releases the chromagen from the capsules for reaction with the electron acceptor material to provide a visible image comprising address or other information. Such paper is available from several sources including NCR Corporation, Boise Corporation and Mead Data Corporation. According to the present invention, self-contained paper is received in bulk sheet or rolled form and then cut into a plurality of mailing labels which are adapted to receive address or other mailing information once affixed to a multi-ply mailer. According to the invention, one or more self-contained paper labels are adapted to replace spot coatings of carbon ink on the backside of a top record sheet. This technique obviates the top record sheet completely. The resulting mailer is much easier for the customer to use because there is no need to remove and then discard an extra sheet. Moreover, the self-contained paper labels are also adapted to replace spot coatings of autogenous material, such as shown in the Chang Patent, U.S. Pat. No. 4,425,386, which have proven difficult to apply in a uniform manner and difficult to use in practice without bruising.

Figure 1:
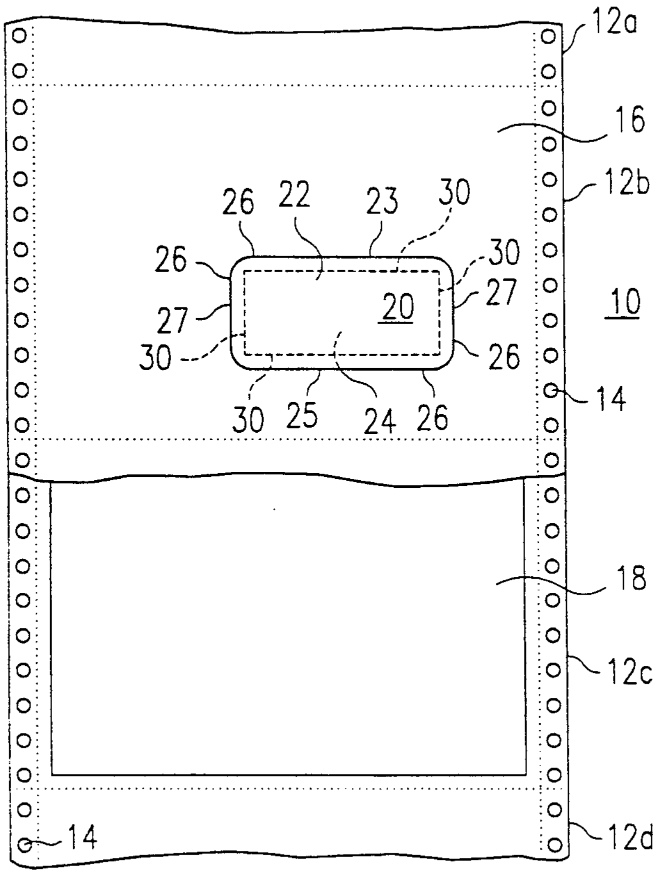
FIG. 1 is a plan view, partially sectioned, of a multiply mailer including a self-contained label affixed thereto according to the present invention.

Referring now to FIG. 1, a portion of a continuous web of multi-ply mailer forms is shown. Such forms are well-known in the prior art as shown, for example, in U.S. Pat. Nos. 3,988,971, 4,095,695, 4,418,865 and 4,492,334, which patents are incorporated herein by reference. Continuous web 10 includes a plurality of multi-ply mailer forms 12*a*, 12*b*, 12*c* and 12*d*. Line holes 14 are provided for advancing the web 10 through the various processing stages. Preferably, each multi-ply mailer 12 includes a top sheet 16 that forms the outer front portion of an outgoing envelope, and at least one intermediate sheet 18 generally consisting of a customer bill. A back sheet (not shown) forms the back side of the outgoing envelope. Alternatively, the mailer may include one or more additional intermediate sheets which form an enclosed return envelope in which the customer can enclose and return a payment. The teachings of the present invention are thus applicable to any type of multi-ply business form having a plurality of sheets in superimposed relationship.

Each top sheet 16 has a predetermined surface area. In the preferred embodiment, at least one discrete paper label 20, substantially smaller than the predetermined surface area of the top sheet 16, is secured to the top sheet at a predetermined location. It should be appreciated that the size of the paper label merely depends on the amount of information to be printed thereon or the size of such information vis-a-vis the size of the top sheet. Generally, however, the paper label is substantially smaller that the surface area of the mailer. The discrete paper label 20 has a front side 22, a rear side 24 and an peripheral edge 26. The label advantageously comprises an admixture of electron-acceptor material and chromagen-containing microscopic pressure-rupturable capsules. In the embodiment shown in FIG. 1, the label 20 is secured to the top sheet 16 at a selected location (generally an outgoing mailing address) using an adhesive 30 located on the rear side 24 of the paper label adjacent predetermined portions of the peripheral edge. The adhesive 30 maintains the label is the selected location under the impact of a ribbonless printing stylus. The adhesive maintains the label is the selected location under the impact of a ribbonless printing stylus.

In the preferred embodiment of FIG. 1, the adhesive 30 extends adjacent the entire peripheral edge of the rear side 24 of the label. Alternatively, the adhesive extends along the top and bottom edges 23 and 25 of the label, or the adhesive extends along only the side edges 27. The majority of the rear side of the label, however, is substantially free of adhesive to avoid activation of the pressure-rupturable capsules during affixation of the paper label to the top sheet.

The adhesive 30 is preferably a food adhesive, water-soluble or hot-melt, resin-based glue. Such glue is available from several manufacturers. For example, Natural Starch & Chemical Corporation manufactures and markets such products under Product Nos. 33-6079 and 34-3020.

Figure 2:
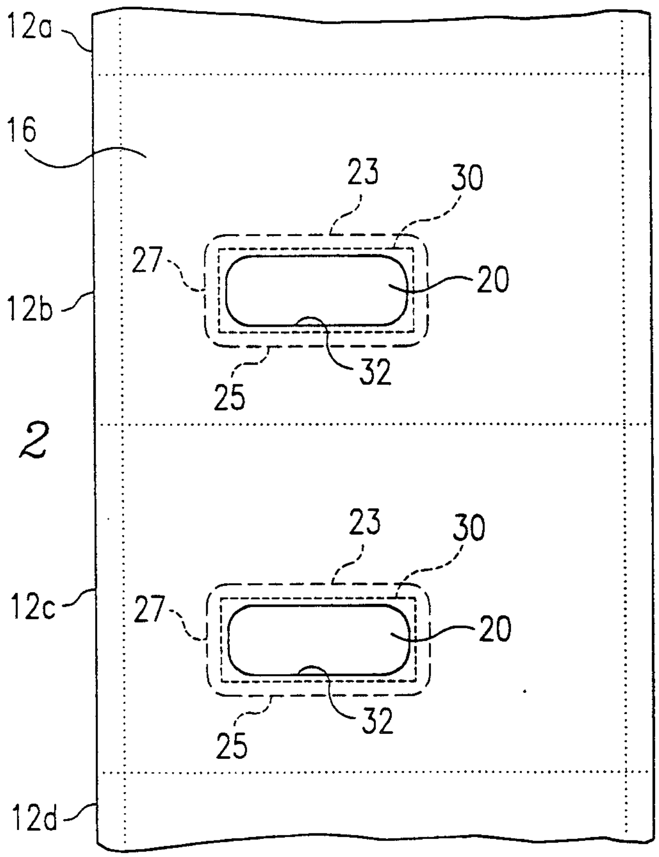
FIG. 2 is a plan view, partially sectioned, of an alternate embodiment of the multi-ply mailer of FIG. 1 wherein the self-contained label is affixed to the back side of the top sheet to cover a die cut window.

Referring now to FIG. 2, an alternate embodiment of the invention is shown wherein each self-contained paper label 20 is affixed to the interior face of the top sheet 16 to cover a previously-made die cut window 32. In particular, it is known in the prior art to die cut a window 32 from a portion of the top sheet of the mailer. One such mailer is shown in U.S. Pat. No. 3,411,699 to Pine et al. In the embodiment of FIG. 2, adhesive 30 extends along the top, bottom and side edges 23, 25 and 27 of the front side 22 of the paper label 20 to thereby secure the label over the die cut window.

Although not shown in detail, it should also be appreciated that more than one self-contained paper label can be affixed to the front and/or back of the top sheet, to the intermediate sheet(s), or to any other portion of the multiply mailer so as to accomodate the printing of information to selected locations on the mailer. The technique, however, avoids the use of extraneous sheets which must be removed and/or discarded by the user. Moreover, the use of self-contained labels as opposed to autogenous coatings is highly advantageous because the labels do not bruise and are far simplier to affix than the coatings. The embodiment of FIG. 2 is especially useful because the addition of the paper label in the die cut window does not increase the size (i.e. the depth) of the mailer. Mailer forms can therefore be stacked on top of the mailer of FIG. 2 without activating the autogenous material.

Figure 3:
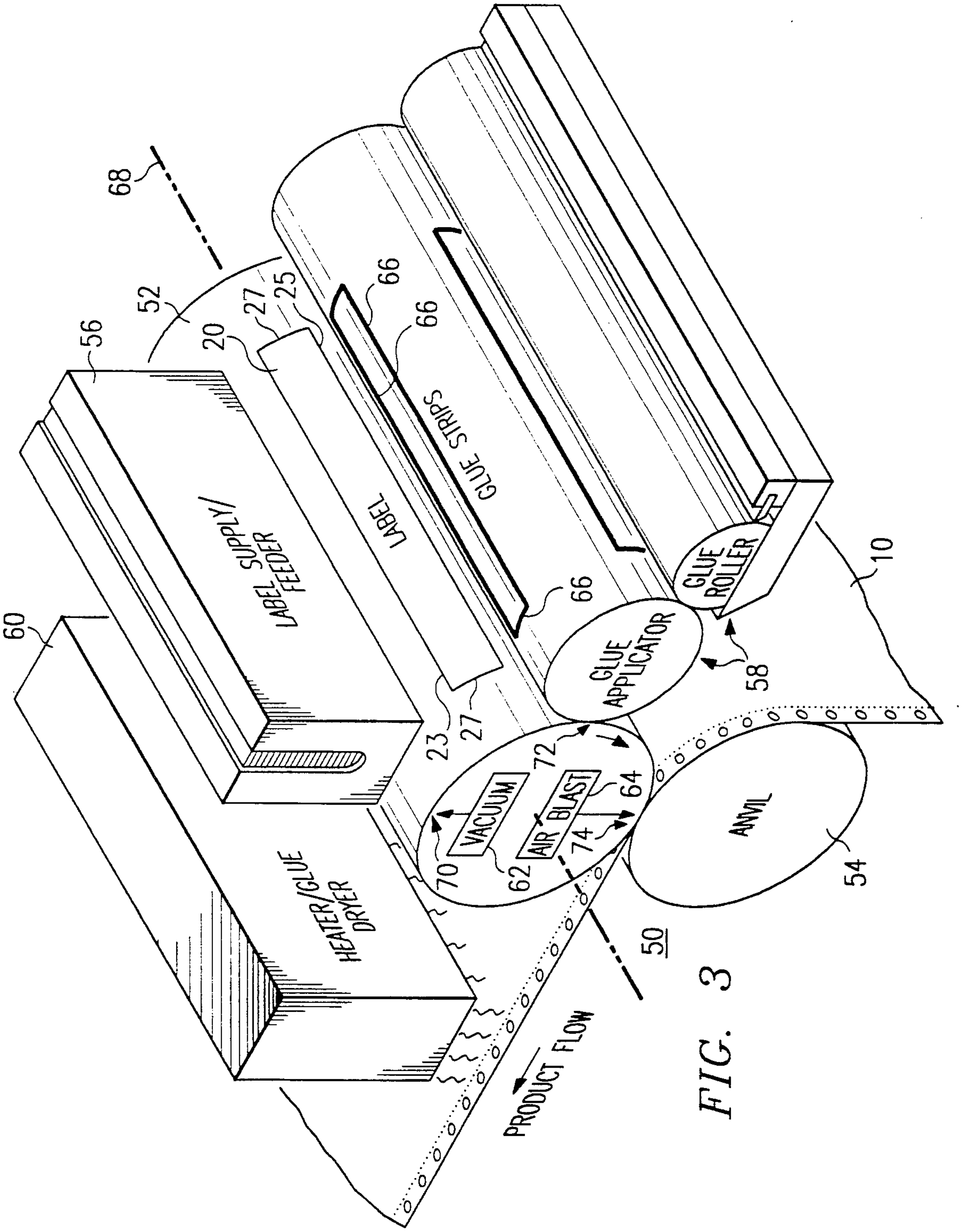
FIG. 3 is a schematic and perspective view of a preferred apparatus for selectively affixing self-contained paper labels to a continuous web of multi-ply mailers in accordance with a method of the present invention.

In accordance with yet a further feature of the invention, a method and apparatus is described for affixing paper labels to multi-ply mailers. Referring now to FIG. 3. the apparatus 50 generally includes a rotatable platen 52, an anvil 54 on which the web 10 of FIG. 1 continually advances, a label supply/feeder 56, a glue applicator/roller mechanism 58 and a heater/glue dryer 60. The rotatable platen 52 includes a means 62 for applying a vacuum at selected positions about the periphery of the platen as will be described, and a means 64 for blasting a label from the platen 52. In the apparatus of FIG. 3, adhesive strips 66 are adapted to be placed horizontally along the top and bottom edges 23 and 25 of the paper label 20, and also vertically along side edges 27.

In operation of the apparatus 50 of FIG. 3, the rotatable platen is designed to rotate clockwise about an axis of rotation 68. According to the preferred embodiment, the method for affixing a label begins with the step of suctioning a discrete paper label from the label supply/-feeder 56 onto the rotatable platen 52 at a first predetermined position 70 relative to the axis of rotation 68. The suctioning step is carried out by the vacuum means 62. As noted above, preferably the paper label comprises an admixture of electron-acceptor material and chromagen-containing microscopic pressure-rupturable capsules. As the rotatable platen 52 rotates, the glue applicator/roller mechanism 58 applies adhesive strips 66 to predetermined exposed portions of the paper label 20. This step takes place at a second predetermined position 72 of the platen 52 relative to the axis of rotation 68 thereof. Finally, at a third predetermined position 74 of the platen 52 relative to the axis of rotation 68, the paper label 20 is blown off the rotatable platen 52 and onto the adjacent continuously-advancing web 10 comprising multi-ply mailer forms 12. The label is blown off the platen by the air blasting means 64. The paper label 20 is thereby affixed to a multi-ply mailer form at a predetermined location.

After the continuously-advancing web 10 receives the label transferred thereto from the platen 52, the web is immediately heated by the heater/glue dryer 60. This operation insures that the adhesive dries prior to reacting chemically with any of the autogenous materials in the label. Coupled with the selective placement of the adhesive and the use of vacuum/air blasting transfer to and from the platen 52, the likelihood of premature rupture of the chromagen-containing microscopic pressure-rupturable capsules is significantly reduced if not eliminated.

Preferably, the rotatable platen 52 receives a new paper label at the first predetermined position 70 of the platen 52 as the glue applicator/roller applies adhesive to the label previously received on the platen. The adhesive is then applied to the second label while the first label is being blown off the platen 52 at the third position 72.

It should be appreciated by those skilled in the art that the specific embodiments disclosed above may be readily utilized as a basis for modifying or designed other structures for carrying out the same purposes of the present invention. For example, the paper labels can be provided in roll form to the label supply/feeder 60 and then cut prior to being drawn, one-by-one, onto the rotatable platen 52. The adhesive can be applied only along the side edges of the label, or only along one side edge and the top or bottom edge. It should also be realized by those skilled in the art that such equivalent constructions do not depart from the spirit and scope of the invention as set forth in the appended claims.

What is claimed is:

1. A method of affixing paper labels to multi-ply mailers using a rotatable platen having a circumferential perimeter, comprising the steps of:

(a) suctioning a discrete paper label onto the rotatable platen at a first predetermined position relative to the circumferential perimeter, the paper label comprising an admixture of electron-acceptor material and chromagen-containing microscopic pressure-rupturable capsules;

(b) applying adhesive to a predetermined exposed portion of the paper label at a second predetermined position relative to the circumferential perimeter;

(c) at a third predetermined position relative to the circumferential perimeter, blowing the paper label off the rotatable platen and onto an adjacent continuously advancing web comprising multi-ply mailer forms each having a plurality of sheets in superimposed relationship, wherein the paper label is affixed to a multi-ply mailer form at a predetermined location, wherein the predetermined exposed portion of the paper label consists of peripheral edge portions of the label, with non-peripheral edge portions of the label being substantially free of adhesive to avoid activation of the pressure-rupturable capsules during transfer of the label to the mailer; and (d) heating the continuously advancing web following transfer of the paper label to the mailer to thereby dry the adhesive prior to any chemical reaction between the adhesive and the chemicals in the label.

2. The method of affixing paper labels to multi-ply mailers as described in claim 1 further including the step of:

(d) repeating steps (a)-(c) as the web of multi-ply mailer forms is continuously advanced.

3. The method of affixing paper labels to multi-ply mailers as described in claim 1 further comprising the step of:

(d) repeating step (a) for a new paper label during step (b); and (e) repeating step (b) for the new paper label during step (c).

* * * * *